United States Patent
Little

(10) Patent No.: US 9,246,908 B2
(45) Date of Patent: *Jan. 26, 2016

(54) ADDING BIOMETRIC IDENTIFICATION TO THE CLIENT SECURITY INFRASTRUCTURE FOR AN ENTERPRISE SERVICE BUS SYSTEM

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 466 days.

This patent is subject to a terminal disclaimer.

(21) Appl. No.: 12/350,906

(22) Filed: Jan. 8, 2009

(65) Prior Publication Data

US 2010/0175121 A1 Jul. 8, 2010

(51) Int. Cl.
*H04L 29/06* (2006.01)

(52) U.S. Cl.
CPC ........ H04L 63/0823 (2013.01); H04L 63/0861 (2013.01)

(58) Field of Classification Search
CPC .......... H04L 63/0861; H04L 63/0823
USPC .............................. 726/10, 2–5, 21
See application file for complete search history.

(56) References Cited

U.S. PATENT DOCUMENTS

| | | | |
|---|---|---|---|
| 6,310,966 B1 * | 10/2001 | Dulude et al. | 382/115 |
| 6,505,193 B1 * | 1/2003 | Musgrave et al. | |
| 6,934,848 B1 * | 8/2005 | King et al. | 713/182 |
| 7,103,778 B2 | 9/2006 | Kon et al. | |
| 7,366,904 B2 * | 4/2008 | Roh et al. | 713/175 |
| 7,698,565 B1 * | 4/2010 | Bjorn et al. | 713/186 |
| 8,082,154 B2 * | 12/2011 | Novack et al. | 704/273 |
| 8,086,867 B2 * | 12/2011 | Freeman et al. | 713/186 |
| 2006/0036442 A1 * | 2/2006 | Novack et al. | 704/273 |
| 2009/0080708 A1 * | 3/2009 | Mellen et al. | 382/115 |
| 2009/0106558 A1 * | 4/2009 | Delgrosso et al. | 713/184 |
| 2010/0088258 A1 | 4/2010 | Oaten et al. | |
| 2010/0242102 A1 * | 9/2010 | Cross et al. | 726/7 |

OTHER PUBLICATIONS

A. Panhelainen, "Security in integration and Enterprise Service Bus (ESB)," Tieto Oy, 2008, available online at https://www.owasp.org/images/3/3b/Security_in_integration_and_ESB-OWASP_20091020.pdf, 10 pages.*
"Database," The American Heritage Dictionary of the English Language, Houghton Mifflin Company, 2007, 1 page.*
"Authenticate," Webster's Third New International Dictionary, 2001, 1 page.*
Hinton et al., "Security Patterns within a Service-Oriented Architecture," IBM, Nov. 2005, 19 pages.*
Jboss Enterprise SOA Platform, www.redhat.com/jboss, 2007, 5 pgs.
Jboss ESB 4.4 GA, Getting Started With Jboss ESB, JBESB-GS—Aug. 5, 2008, 13 pgs.

(Continued)

*Primary Examiner* — Mohammad A Siddiqi
(74) *Attorney, Agent, or Firm* — Lowenstein Sandler LLP

(57) ABSTRACT

An enterprise service bus client accesses a user's biometric information, where the biometric information is accessed from a biometric input device coupled to the enterprise service bus client. Furthermore, the enterprise service bus client retrieves a certificate using the user's biometric information. With the certificate, the enterprise service bus client establishes a connection with an enterprise service bus server and accesses an enterprise service bus service.

10 Claims, 7 Drawing Sheets

(56) References Cited

OTHER PUBLICATIONS

Jboss ESB, What is an ESB?, http://www.jboss.org/jbossesb/resources/WhatIsAnESB.html, Dec. 16, 2008, 2 pgs.

Jboss ESB 4.4 GPA, Services Guide, http://www.jboss.org/jbossesb/docs/4.4.GA/manuals/pdf/ServicesGuide.pdf,JBESB-SG—Aug. 5, 2008, 73 pages.

Jboss Operations Network FAQ, http://www.redhat.com/f/pdf/JON2_faq.pdf, 2008, 2 pgs.

King, Erik, "Perpetual Enterprise Management Service (PEMS) for Next Generation SOA-based Command & Control Systems", Jun. 2005, 26 pages.

King, Erik, "Perpetual Enterprise Management Service (PEMS) for C2 SOA Deployments", Jun. 14, 2005, 23 pages.

Office Action for U.S. Appl. No. 12/350,908, mailed Jun. 9, 2011.

Red Hat, Inc. Final Office Action for U.S. Appl. No. 12/350,908 mailed Dec. 8, 2011.

Red Hat, Inc. Advisory Action for U.S. Appl. No. 12/350,908 mailed Feb. 24, 2012.

Non-Final Office Action for U.S. Appl. No. 12/350,908 mailed Jun. 7, 2012.

Final Office Action for U.S. Appl. No. 12/350,908 mailed Dec. 28, 2012.

Advisory Action for U.S. Appl. No. 12/350,908 mailed Mar. 18, 2013.

Non-Final Office Action for U.S. Appl. No. 12/350,908 mailed Apr. 25, 2013.

Final Office Action for U.S. Appl. No. 12/350,908 mailed Nov. 20, 2013.

* cited by examiner

ADDING BIOMETRIC IDENTIFICATION TO THE CLIENT SECURITY INFRASTRUCTURE FOR AN ENTERPRISE SERVICE BUS SYSTEM

RELATED APPLICATIONS

This patent application is related to the co-pending U.S. Patent Application, entitled "Adding Biometric Identification To The Server Security Infrastructure For An Enterprise Service Bus System", application Ser. No. 12/350,908, filed Jan. 8, 2009. The related co-pending application is assigned to the same assignee as the present application.

TECHNICAL FIELD

Embodiments of the present invention relate to a method and system for security. Specifically, embodiments of the invention relate to adding a biometric identification to the client and server security infrastructure for an enterprise service bus system.

BACKGROUND

A service oriented architecture (SOA) enables enterprises to integrate services, handle business events, and automate business processes more efficiently. For example, an SOA links information technology resources, data, services, and applications. An SOA can include an enterprise service bus (ESB). An ESB is an event-driven and standards-based messaging engine that provides services for more complex architectures. The ESB provides infrastructure that links together service and clients to enable distributed applications and processes. For example, an ESB can include one or more busses that logically interconnect available services and clients.

The ESB interconnects service and clients using different protocols such as hypertext transfer protocol, common object request broker architecture, Java™, file transfer protocol, and email. In addition, ESB adds a layer of security to the connections using certificate exchange between the ESB client and ESB server. ESB uses the security to allow/disallow ESB clients to ESB services.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

The ESB security system authenticates a user of ESB services using the user biometric information. In particular, in one embodiment, an ESB client accesses the user's biometric information, such as the user's fingerprint information, iris characteristics, facial recognition, hand geometry, deoxyribonucleic acid properties. etc. via a biometric input module coupled to the ESB client. The ESB client matches this biometric information with biometric information stored in a certificate database. The certificate server can be local to the ESB client or stored on a certificate server that is remote from the ESB client. If the ESB client determines there is a match between the user's biometric information and the biometric information stored on the certificate database, the ESB client retrieves a certificate from the certificate database. With the retrieved certificate the ESB client establishes a connection to the ESB and access ESB services.

In another embodiment, the ESB client accesses the user's biometric information via a biometric input module coupled to the ESB client and sends this biometric information to an ESB server. The ESB server receives the user's biometric information and attempts to authenticate the user based on the biometric information with a trusted third party authenticator. The trusted third party authenticator sends back a message authenticating the user to the ESB server. The ESB system establishes a connection with the ESB client and allows the ESB client to access ESB services.

Figure 1:
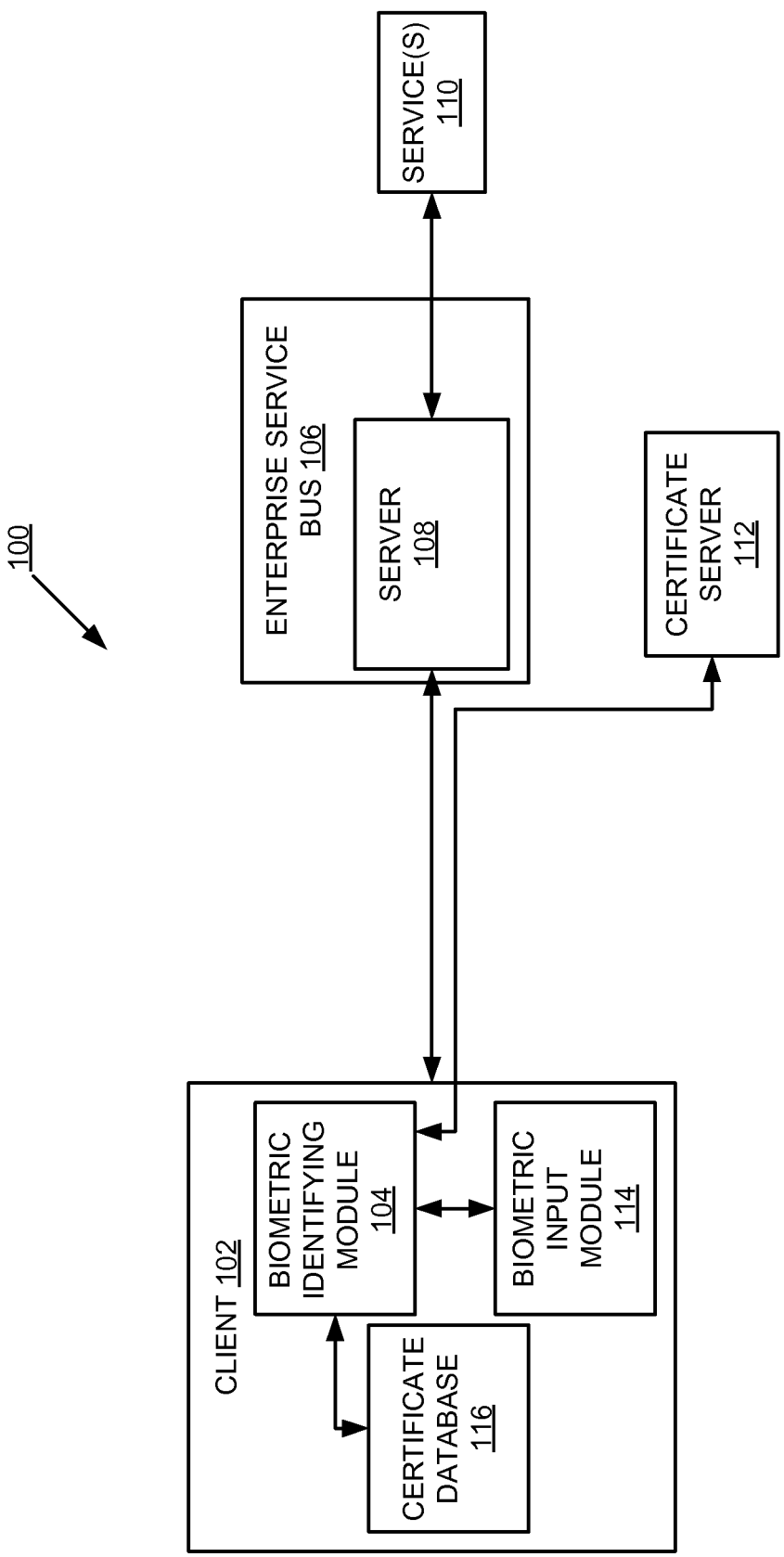
FIG. 1 is a block diagram of one embodiment of ESB security system using biometric identification with certificates.

FIG. 1 is a block diagram of one embodiment of ESB security system 100 using biometric identification with certificates. In FIG. 1, ESB security system comprises client 102 communicating with ESB 106 to access service(s) 110. In this embodiment, client 102 establishes a connection with ESB 106 using a public key certificate. A public key certificate is an electronic document that incorporates a digital signature of a user to bind together a public key with the user's identity. This certificate is used to verify that the public key belongs to an individual. Using the certificate, client 102 identifies the user of client 102 to ESB 106. Based on the certificate, ESB 106 allows connection to none, some, or all of service(s) 106. In one embodiment, ESB 106 allows the connection using ESB server 108.

Instead of client 102 just sending the certificate to ESB 106, client 102 uses a user's biometric information to identify the user to client 102. Once the user is identified, client 102 sends the user's certificate to ESB 106. As is known in the art, biometric information is information that describes or identifies a person based on physiological or behavioral characteristics. For example and in one embodiment, physiological biometric information identifies a user based on the user's fingerprint, iris characteristics, facial recognition, hand geometry, deoxyribonucleic acid (DNA) properties, etc. As another example and in another embodiment, behavioral biometric information identifies a user based on the user's voice characteristics.

Client 102 comprises biometric identification module 104, biometric input module 114, and (optionally) certificate database 116. Biometric input module 114 is a module that acquires the user's biometric information. For example, and in one embodiment, biometric input module 114 is a fingerprint scanner, retinal scanner, facial recognition system, hand geometry recognition system, voice analyzer, DNA analyzer, etc.

Biometric identification module 104 access the user's biometric information from biometric input module 114 and determines if the user's biometric information matches biometric information known to client 102. In one embodiment, biometric identification module 104 matches the user's biometric information with the biometric information stored in a certificate database 116 that is part of client 102. In this embodiment, biometric identification module 104 queries certificate database 116 with the user's biometric information to determine if there is a match. If there is a match, certificate database 116 returns the stored certificate that corresponds to the user's biometric information. In one embodiment, certificate database 116 matches the biometric information to identify the user. In another embodiment, certificate database 116 matches the biometric information and some other information (name, user name, password, etc, and/or a combination thereof) to identify the user. Client 102 uses this stored certificate to access service(s) 110 via ESB 106 via an ESB 106 access transport, such as hypertext transfer protocol, common object request broker architecture, Java™, file transfer protocol, and email. This certificate can be used by client 102 to access some or all of the available service(s) 110.

In an alternate embodiment, biometric identification module 104 queries certificate server 112 that is remote from client 102 with the user's biometric information to determine if there is a match. If there is a match, certificate server 112 returns the stored certificate that corresponds to the user's biometric information. Client 102 uses this stored certificate to access service(s) 110 via ESB 106 using one of the access transports listed above.

In both of the above embodiments of FIG. 1, biometric identification module 104 acts as a bridge between biometric input module 114 that is part of client 102 and the certificate base security infrastructure of ESB 106. Thus, in FIG. 1, client 102 uses the existing ESB security infrastructure to bridge biometric information accessed by client 102 and the certificates used by ESB server to authenticate the user.

Figure 2:
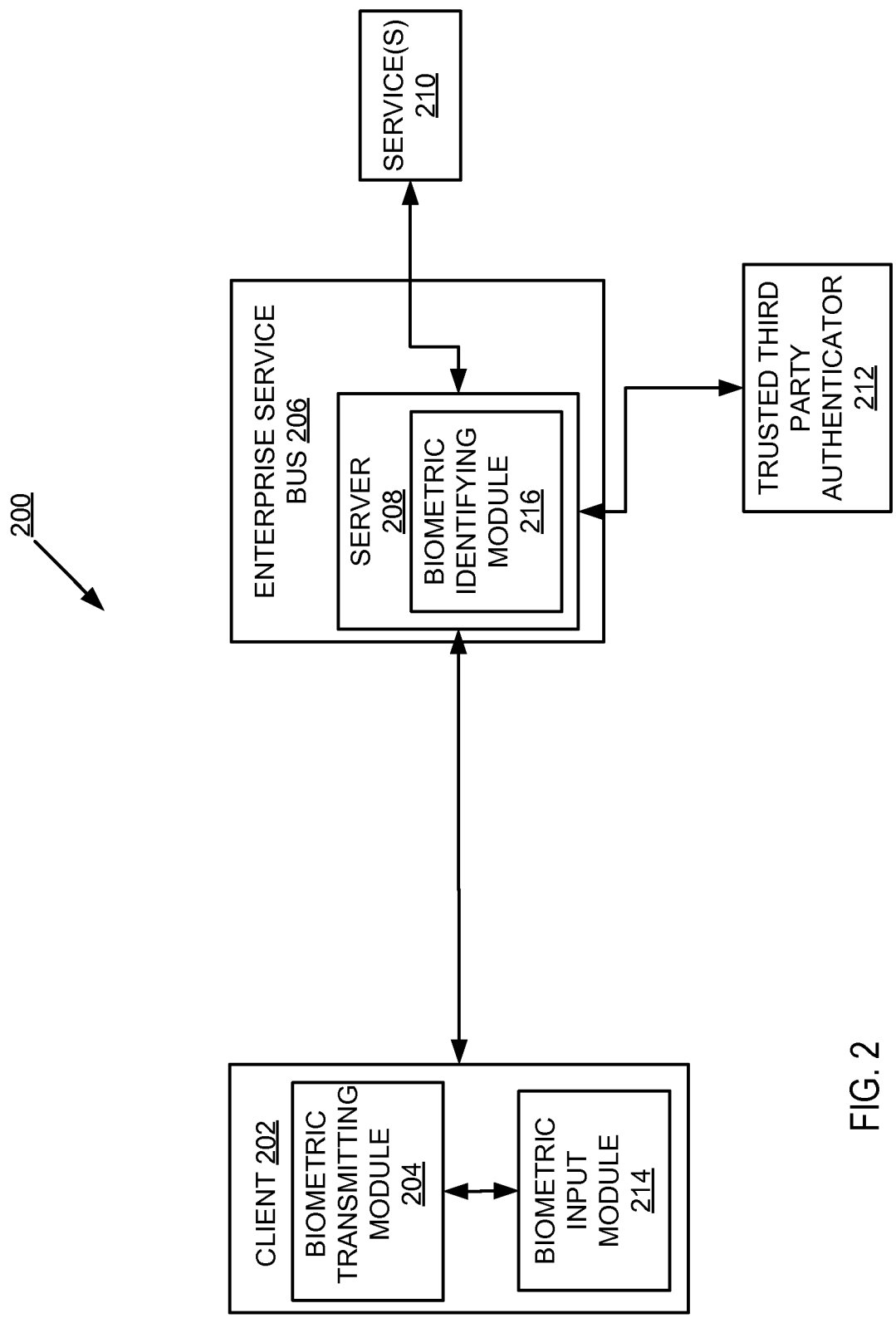
FIG. 2 is a block diagram of one embodiment of ESB security system using biometric identification with trusted third party biometric repository.

In another embodiment, a client can establish a connection to access ESB services without using certificates and sending the biometric information to ESB. FIG. 2 is a block diagram of one embodiment of ESB security system 200 using biometric identification with trusted third party biometric authenticator 212. In FIG. 2, ESB security system comprises client 202 communicating with ESB 206 to access service(s) 210. Unlike in FIG. 1, in this embodiment, client 202 establishes a connection with ESB 106 using a user's biometric information communicated between client 202 and server 208. This biometric information is used to verify that user is allowed to access service(s) 210. Based on the biometric information, ESB 206 allows connection to none, some, or all of service(s) 206.

Client 202 comprises biometric transmitting module 204 and biometric input module 214. As in FIG. 1, biometric input module 214 is a module that acquires the user's biometric information. For example, and in one embodiment, biometric input module 214 is a fingerprint scanner, retinal scanner, facial recognition system etc. Biometric transmitting module 204 accesses the acquired biometric information and transmits the acquired biometric information to server 208. In one embodiment, biometric transmitting module 204 embeds the biometric information in an ESB message. In this embodiment, client 202 receives a message from server 208 indicating whether the authentication based on the succeeded or not.

In response to the transmitted biometric information, server 208 attempts to authenticate client 204 using this biometric information. In this embodiment, server 208 comprises biometric identifying module 214. Biometric identifying module 214 queries trusted third party authenticator 212 with the user's biometric information to determine if there is a match. If there is a match, trusted third party authenticator 212 sends an authenticate allowed message back to server 208. In one embodiment, the authenticate allowed message is an ESB message. In an alternate embodiment, server 208 embeds the biometric information in a Remote Authentication Dial In User Service (RADIUS) message. In this embodiment, server 208 uses the RADIUS protocol to authenticate client 204 using the user's biometric information. Server 208 establishes a connection with client 202 and allows client 202 to access service(s) 210.

In one embodiment, trusted third party authenticator 212 is a system that stores biometric information and authenticates requests based on the stored biometric information. For example and in one embodiment, trusted third party authenticator 212 can be a private or governmental party that compiles biometric information for uses in many different systems (ESB, etc.). Alternatively, trusted third party authenticator 212 can be a bank, insurance company, etc.

Figure 3:
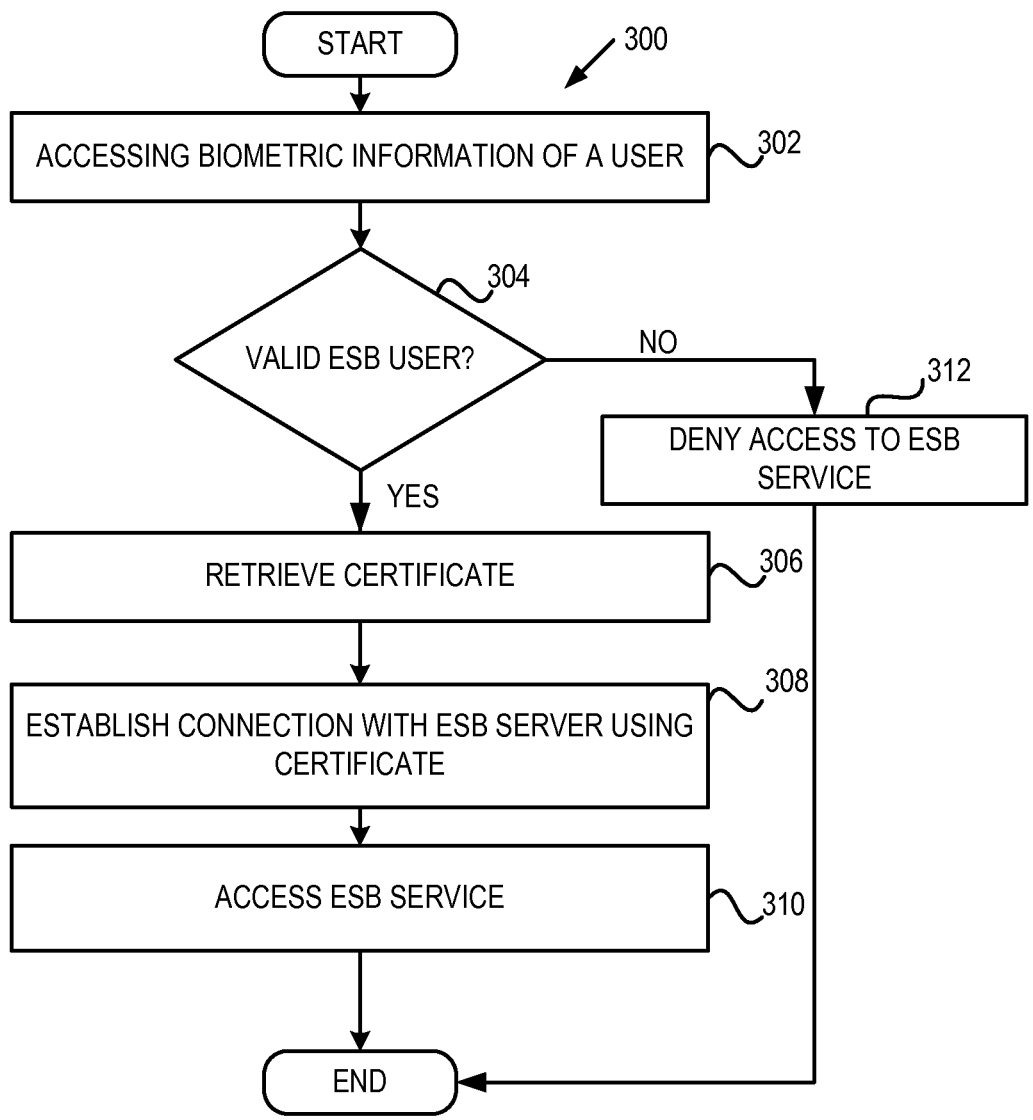
FIG. 3 is a flowchart of one embodiment of a process for accessing an ESB service using a certificate retrieved using a user's biometric information.

FIG. 3 is a flowchart of one embodiment of a process 300 for accessing an ESB service using a certificate generated from a user's biometric information. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 300 is performed by a biometric identification module used in a client, such as biometric identification module 104 of FIG. 1.

Referring to FIG. 3, process 300 begins with processing logic accessing the user's biometric information at block 302. In one embodiment, process 300 accesses fingerprint information from a fingerprint scanner. In alternative embodiments, process 300 access other types of biometric information using a different type of system (retinal scanner, facial recognition system, etc.).

At block 304, process 300 determines if the user is a valid ESB user based on the accessed biometric information. In one embodiment, process 300 determines if the user is valid ESB user by matching the accessed biometric information with biometric information stored in a local certificate database as described with reference to FIG. 1. In another embodiment, process 300 queries a remote certificate server using the accessed biometric information to determine if the user associated with the biometric information is allowed.

If the user is not a valid ESB user, process 300 denies access to the ESB service(s) and the process ends at block 312. However, if the user is a valid ESB user, process 300 generates a certificate at block 306. In one embodiment, process 300 generates a certificate by retrieving the corresponding certificate from a local certificate database as described in reference to FIG. 1. Alternatively, process 300 receives a certificate from a remote certificate server as described in reference to FIG. 1.

At block 308, process 300 establishes a connection between the client and the ESB server using the retrieved certificate. Process 300 accesses the ESB service at block 310.

In FIG. 3, process 300 accessed the user's biometric information to match and retrieve a certificate that is used to establish a secure connection with the ESB server. As described in FIG. 2 above, a process can transmit the biometric information to the ESB server and have the ESB server authenticate the user with the received biometric information using a trusted third party authenticator.

Figure 4:
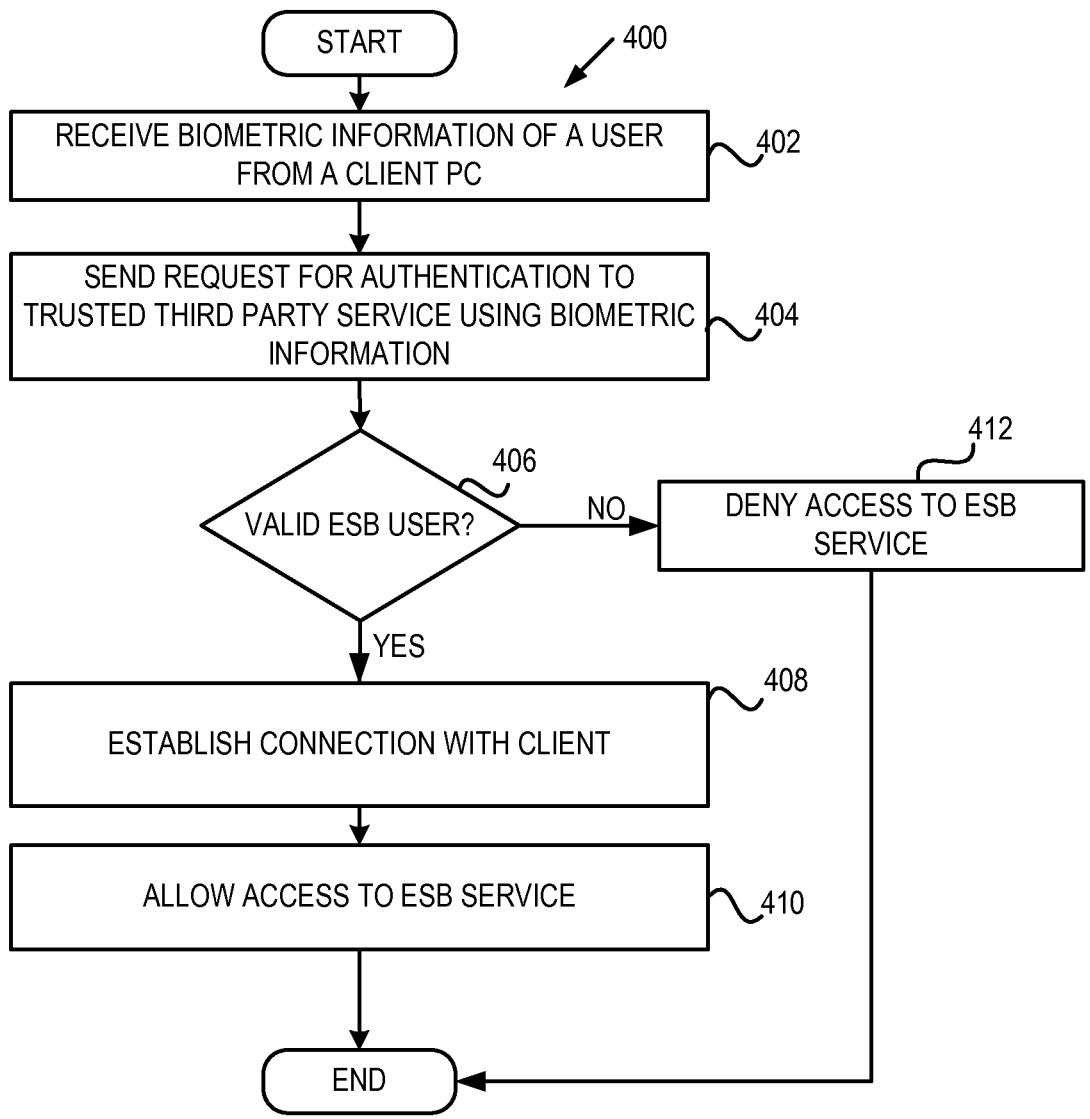
FIG. 4 is a flowchart of one embodiment of a process for accessing an ESB service using a user's biometric information and a trusted third party authenticator.

FIG. 4 is a flowchart of one embodiment of a process 400 for authenticating a user with received biometric information and a trusted third party authenticator. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 400 is performed by a biometric identification module used in a server, such as biometric identifying module 216 of FIG. 1.

Referring to FIG. 4, process 400 begins with processing logic receiving biometric information of a user from a client at block 402. In one embodiment, process 400 receive biometric information from client 202 that includes a biometric input module 214 that client 202 uses to access the user's biometric information.

At block 404, process 400 requests authentication of a user from a third party authenticator using the received biometric information. In one embodiment, process 400 sends an authentication request to trusted third party authenticator 212 as described with reference to FIG. 2. In one embodiment, process 400 sends an ESB message. Process 400 determines if the user is a valid ESB user at block 406. In one embodiment, process 400 determines if the user is valid ESB user by receiving an authentication allowed message from trusted third party authenticator 212 as described in reference to FIG. 2 above. In one embodiment, the authentication allowed message is an ESB message. If process 400 determines that the user is not allowed to access the ESB service(s), process 400 denies for the user's client access to the ESB service(s) at block 412.

If the user is a valid user, process 400 establishes a connection with client at block 408. In one embodiment, establishes a connection to the ESR service(s). At block 410, process 400 allows access to the ESB service(s).

Figure 5:
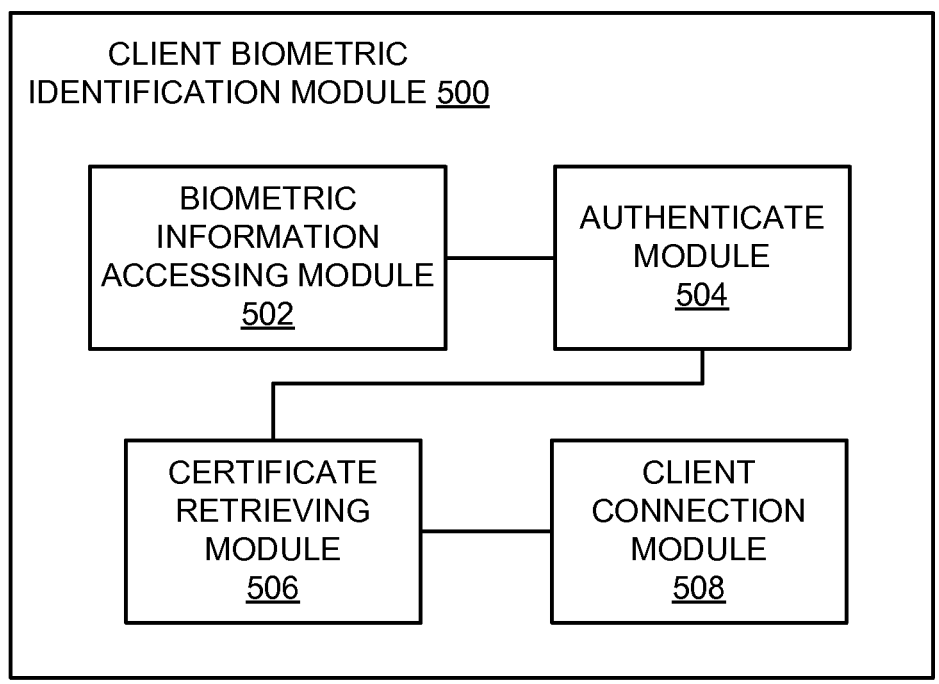
FIG. 5 is a block diagram of a biometric indentifier that retrieves a certificate from a user's biometric information.

FIG. 5 is a block diagram of a biometric identification module 500 that generates a certificate from a user's biometric information. In one embodiment, client biometric identification module 500 is biometric identification module 104 of client 102 in FIG. 1 above. Biometric identification module 500 comprises biometric information accessing module 502, authenticate module 504, certificate retrieving module 506, and client secure connection module 508. Biometric information accessing module 502 accesses biometric information that is generated using a biometric input module, such as biometric input module 114 of client 102 in FIG. 1. In one embodiment, biometric information accessing module 502 accesses the biometric information as described in FIG. 3, block 302. Authenticate module 504 uses the accessed biometric information to authenticate the user as described in FIG. 3, block 304. Certificate retrieving module 506 retrieves the certificate for the user as described in FIG. 3, block 306. Client secure module 508 establishes a connection using the generated certificates between client and an ESB server as described in FIG. 3, block 308.

Figure 6:
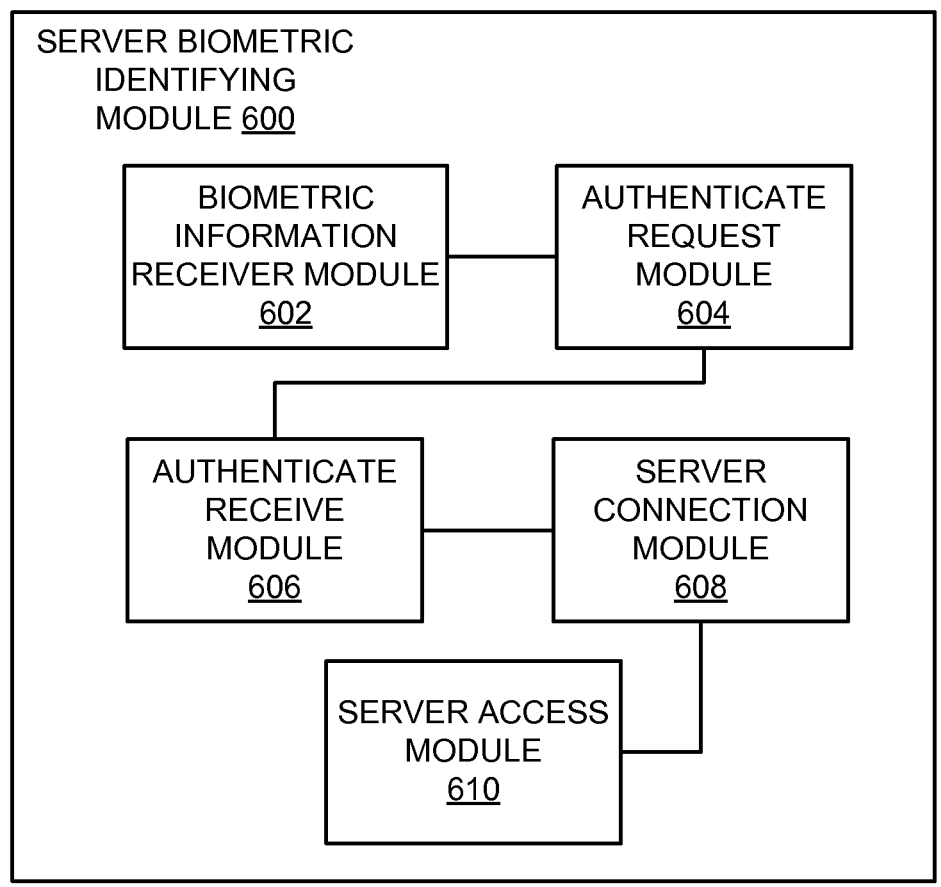
FIG. 6 is a block diagram of a biometric indentifier that identifies a user with the user's biometric information and a trusted third party authenticator.

FIG. 6 is a block diagram of a server biometric identifying module 600 that identifies a user with the user's biometric information and a trusted third party repository of biometric information. In one embodiment, server biometric identifying module 600 is biometric identifying module 214 of ESB server 208 in FIG. 1 above. Server biometric identifying module 600 comprises biometric information receiver module 602, authenticate request module 604, authenticate receive module 606, server connection module 608, and server access module 608. Biometric information receiving module 602 receives biometric information that is generated using a biometric input module, such as biometric input module 214 of client 202 in FIG. 2. In one embodiment, biometric information receiving module 602 receives the biometric information as described in FIG. 4, block 402. Authenticate request module 604 uses the received biometric information to request an authentication of the user as described in FIG. 4, block 404. Authenticate receive module 406 receives the response to the authentication request and determines if the user is an valid ESB user as described in FIG. 4, block 406. Server connection module 608 establishes a connection using between the ESB client and the ESB server as described in FIG. 4, block 408. Server access module 610 allows access to ESB service(s) for the ESB client as described in FIG. 4, block 410.

Figure 7:
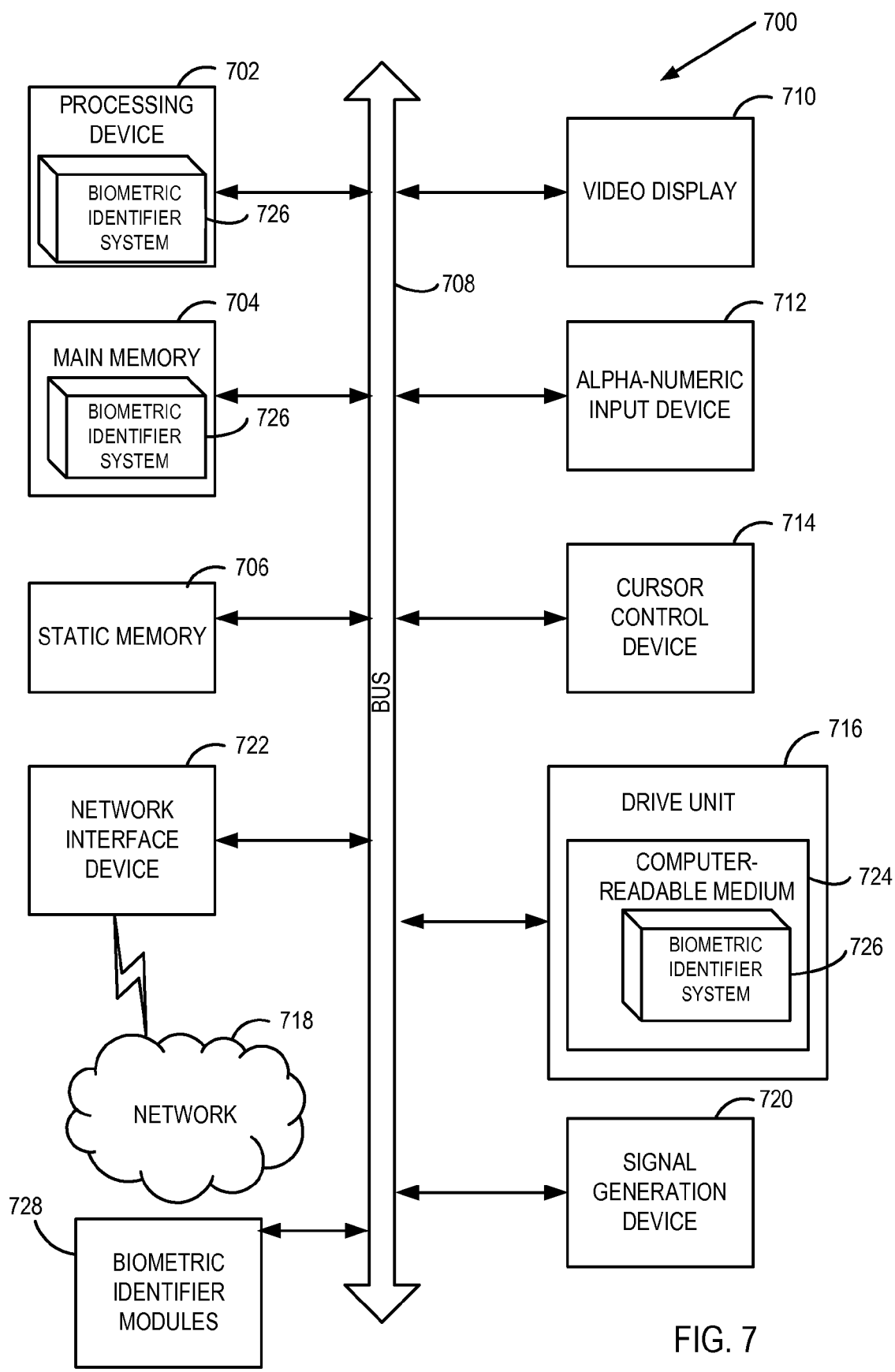
FIG. 7 is a diagram of one embodiment of a computer system for a biometric identifier.

FIG. 7 is a diagram of one embodiment of device 700 for biometric identification. Within the device 700 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer accessing ESB services using certificates retrieved using a user's biometric information and the server computer allowing access to ESB services based on biometric information and a trusted third party biometric repository) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary device 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory 716 (e.g., a data storage device in the form of a drive unit, which may include fixed or removable computer-readable storage medium), which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the ESB communication system 726 for performing the operations and steps discussed herein.

The device 700 may further include a network interface device 722. The device 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions (e.g., the biometric identifier system 726) embodying any one or more of the methodologies or functions described herein. The biometric identifier system 726 may also reside, completely or at least partially, within the main memory 704 and/or within the processing device 702 during execution thereof by the device 700, the main memory 704 and the processing device 702 also constituting machine-readable storage media. The biometric identifier system 726 may further be transmitted or received over a network 718 via the network interface device 722.

The computer-readable storage medium 724 may also be used to store the biometric identifier system 726 persistently. While the computer-readable storage medium 726 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 728, components and other features described herein (for example in relation to FIG. 1) can be implemented as discrete hardware components or integrated in the functionality of hardware components such as ASICS, FPGAs, DSPs or similar devices. In addition, the modules 728 can be implemented as firmware or functional circuitry within hardware devices. Further, the modules 728 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "accessing," "establishing," "querying," "sending," "retrieving," "allowing," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks. CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for communicating ESB messages been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    accessing biometric information of a user with an enterprise service bus (ESB) client, the biometric information accessed from a biometric input device coupled to the ESB client;
    submitting, by a processing device of the ESB client, a query to a certificate database local to the ESB client, wherein the query includes only the biometric information;

identifying, by the processing device of the ESB client, a stored certificate for use in connecting with an ESB server by matching only the biometric information provided in the query with biometric information stored in association with the stored certificate in the certificate database local to the ESB client;

determining, by the processing device of the ESB client, if the user is a valid ESB user authorized to access one or more ESB services via the ESB server by matching the biometric information provided in the query with the biometric information stored in the certificate database local to the ESB client;

after determining the user is a valid ESB user, retrieving, by the processing device of the ESB client, the stored certificate using the biometric information; and establishing, by the processing device of the ESB client, a direct connection with the ESB server using the retrieved certificate.

2. The method of claim 1, wherein the biometric information is at least one of fingerprint information, retinal information, facial characteristics, hand geometry, voice characteristics, or deoxyribonucleic acid information.

3. The method of claim 1, wherein the biometric input device is at least one of a fingerprint scanner, facial recognition system, hand geometry recognition system, voice analyzer, or DNA analyzer.

4. A non-transitory computer readable storage medium having instructions stored thereon that, when executed by a processing system, cause the processing system to:

access biometric information of a user with an enterprise service bus (ESB) client, the biometric information accessed from a biometric input device coupled to the ESB client;

submit a query to a certificate database local to the ESB client, wherein the query includes only the biometric information;

identify a certificate for use in connecting with an ESB server by matching only the biometric information provided in the query with biometric information stored in association with the stored certificate in the certificate database local to the ESB client;

determine, by the ESB client, if the user is a valid ESB user authorized to access one or more services via the ESB server by comparing the biometric information provided in the query with the biometric information stored in a certificate database local to the ESB client;

after the user is determined to be a valid ESB user, retrieve, by the ESB client, the stored certificate using the biometric information; and establish, by the ESB client, a direct connection with an enterprise service bus server using the retrieved certificate.

5. The non-transitory computer readable storage medium of claim 4, wherein the biometric information is at least one of fingerprint information, retinal information, facial characteristics, hand geometry, voice characteristics, or deoxyribonucleic acid information.

6. The non-transitory computer readable storage medium of claim 4, wherein the biometric input device is one of fingerprint scanner, facial recognition system, hand geometry recognition system, voice analyzer, or DNA analyzer.

7. An enterprise service bus (ESB) client comprising:

a biometric information accessing device module of the ESB client to access biometric information of a user, the biometric information accessed from a biometric input device operatively coupled to the client;

a certificate retrieving device module of the ESB client, coupled to biometric information accessing device module, the certificate retrieving device module to:

submit a query to a certificate database local to the ESB client, wherein the query includes only the biometric information;

identify a stored certificate for use in connecting with an ESB server by matching only the biometric information provided in the query with biometric information stored in association with the stored certificate in the certificate database local to the ESB client;

determine if the user is a valid ESB user authorized to access one or more services via the ESB server by comparing the biometric information provided in the query with the biometric information stored in a certificate database local to the client; and retrieve, after the user is determined to be a valid ESB user, the stored certificate using the biometric information; and a client connection device module of the ESB client, coupled to biometric information accessing device module, to establish a direct connection with the enterprise service bus server using the retrieved certificate.

8. The ESB client of claim 7, wherein the biometric information is at least one of fingerprint information, retinal information, facial characteristics, hand geometry, voice characteristics, or deoxyribonucleic acid information.

9. The ESB client of claim 7, the certificate retrieving device module to query the certificate database using the biometric information, and to receive the stored certificate if there is a match of the biometric information in the certificate database.

10. The ESB client of claim 7, wherein the biometric input device is at least one of a fingerprint scanner, facial recognition system, hand geometry recognition system, voice analyzer, or DNA analyzer.

* * * * *